(12) United States Patent
Jiang et al.

(10) Patent No.: US 12,493,055 B2
(45) Date of Patent: Dec. 9, 2025

(54) SIGNAL PROCESSING APPARATUS AND METHOD, AND DIGITAL OSCILLOSCOPE

(71) Applicant: RIGOL TECHNOLOGIES CO., LTD., Jiangsu (CN)

(72) Inventors: Wenyu Jiang, Jiangsu (CN); Yue Wang, Jiangsu (CN)

(73) Assignee: RIGOL TECHNOLOGIES CO., LTD., Jiangsu (CN)

( * ) Notice: Subject to any disclaimer, the term of this patent is extended or adjusted under 35 U.S.C. 154(b) by 0 days.

(21) Appl. No.: 19/098,499

(22) Filed: Apr. 2, 2025

(65) Prior Publication Data
US 2025/0258200 A1 Aug. 14, 2025

Related U.S. Application Data

(63) Continuation-in-part of application No. PCT/CN2024/071113, filed on Jan. 8, 2024.

(30) Foreign Application Priority Data

Mar. 3, 2023 (CN) .......................... 202310196210.1

(51) Int. Cl.
*G01R 13/02* (2006.01)
(52) U.S. Cl.
CPC ................................. *G01R 13/0272* (2013.01)
(58) Field of Classification Search
CPC . G01R 13/02; G01R 13/0209; G01R 13/0254
See application file for complete search history.

(56) References Cited

U.S. PATENT DOCUMENTS

2006/0074607 A1* 4/2006 Weller ............... G01R 13/0254
　　　　　　　　　　　　　　　　　　　702/190
2022/0114869 A1* 4/2022 Tart ......................... G08B 5/36

FOREIGN PATENT DOCUMENTS

| CN | 102053187 A | 5/2011 |
| CN | 102565484 A | 7/2012 |
| CN | 102788892 A | 11/2012 |
| CN | 103713171 A | 4/2014 |

(Continued)

OTHER PUBLICATIONS

English translation CN 110798174 A (Year: 2020).*

*Primary Examiner* — Eman A Alkafawi
*Assistant Examiner* — Courtney G Mcdonnough
(74) *Attorney, Agent, or Firm* — MUNCY, GEISSLER, OLDS & LOWE, P.C.

(57) ABSTRACT

A signal processing apparatus and method, and a digital oscilloscope are provided. The signal processing apparatus is configured to output one of two target signals according to a trigger signal and a trigger level. The signal processing apparatus includes a trigger comparison unit, a trigger display unit, and a controller. The trigger comparison unit is configured to extract a low-frequency component signal from the trigger signal. The controller is electrically connected to the trigger comparison unit and is configured to generate a trigger comparison signal according to a relationship between the low-frequency component signal and the trigger signal, and output a target signal obtained based on the trigger comparison signal according to a preset rule. The trigger display unit is electrically connected to the controller and is configured to receive and display the target signal on a target interactive interface.

16 Claims, 3 Drawing Sheets

(56) References Cited

FOREIGN PATENT DOCUMENTS

| | | | | |
|---|---|---|---|---|
| CN | 206594216 U | | 10/2017 | |
| CN | 110798174 A | * | 2/2020 | ............. H03H 17/00 |
| CN | 114415094 A | | 4/2022 | |
| CN | 114509589 A | | 5/2022 | |
| CN | 116338272 A | | 6/2023 | |
| JP | 2006003326 A | | 1/2006 | |

* cited by examiner

SIGNAL PROCESSING APPARATUS AND METHOD, AND DIGITAL OSCILLOSCOPE

CROSS REFERENCE TO RELATED APPLICATIONS

This application is a Continuation-In-Part Application of International Application No. PCT/CN2024/071113, filed on Jan. 8, 2024, which claims priority to Chinese patent application No. 202310196210.1, filed with the Chinese Patent Office on Mar. 3, 2023, the entire contents of which are incorporated herein by reference.

TECHNICAL FIELD

The present disclosure relates to the field of electronic circuit technology, for example, to a signal processing apparatus and method, and a digital oscilloscope.

BACKGROUND

With the increasing complexity of electronic devices, various tools are needed to record, analyze, and visualize measurement statistical data such as waveform data. As a widely used electronic measuring instrument, an oscilloscope can convert an electrical signal into a waveform image, thereby facilitating the study of changing processes of various electrical signals. The trigger function is a core function of the oscilloscope. The traditional digital oscilloscope mostly adopts digital triggering. The processing of a trigger signal and the expansion of a trigger method can be accomplished by a digital circuit section. To make the collected output waveform more stable and reliable, the digital oscilloscope can set a specific coupling mode according to signal characteristics under the trigger function to filter out noise and prevent false triggering.

When the triggering of the digital oscilloscope is unstable due to low-frequency interference contained in the collected signal, such as 50 Hz power frequency interference in power supply ripple, a low-frequency suppression mode in the trigger function of the digital oscilloscope can be usually adopted. In the digital oscilloscope, in a case that the triggering function adopts the low-frequency suppression mode or an alternating current (AC) triggering coupling mode, the waveform sampled by the digital circuit can pass through a digital low-pass filter, a low-frequency component is suppressed, and a high-frequency component is retained. Therefore, after the trigger signal passes through the filter, the low-frequency signal is suppressed. The deviation of the sampled waveform displayed on an oscilloscope interface from a pulse voltage set by a user is generated due to the lack of a corresponding relationship between the setting of trigger level and the actual trigger signal. Therefore, when adjusting the trigger level, the user cannot intuitively observe relevant information of an actual trigger signal (e.g., peak information of the actual trigger signal) after the low-frequency signal is suppressed, which may result in the adjustment on the trigger level performed by the user being equivalent to blind adjustment without a reference, thereby reducing the setting accuracy of the trigger level.

SUMMARY

The present disclosure provides a signal processing apparatus and method, and a digital oscilloscope.

In one aspect, the present disclosure provides a signal processing apparatus configured to output one of two target signals according to a trigger signal and a trigger level. The signal processing apparatus includes a trigger comparison unit, a trigger display unit, and a controller. The trigger comparison unit is configured to extract a low-frequency component signal from the trigger signal. The controller is electrically connected to the trigger comparison unit and configured to generate a trigger comparison signal according to a relationship between the low-frequency component signal and the trigger signal, and output a target signal obtained based on the trigger comparison signal according to a preset rule. The preset rule includes comparing the trigger comparison signal with the trigger level. The trigger display unit is electrically connected to the controller and is configured to receive the target signal and display the target signal on a target interactive interface.

In another aspect, the present disclosure provides a digital oscilloscope including the signal processing apparatus described in any of the above embodiments.

In yet another aspect, the present disclosure provides a signal processing method for outputting one of two target signals according to a trigger signal and a trigger level. The method includes extracting a low-frequency component signal from the trigger signal; generating a trigger comparison signal according to a relationship between the low-frequency component signal and the trigger signal; outputting a target signal obtained based on the trigger comparison signal according to a preset rule, where the preset rule includes comparing the trigger comparison signal with the trigger level; and receiving the target signal and displaying the target signal on a target interactive interface.

DESCRIPTION OF REFERENCE NUMERALS

100: trigger comparison unit; 200: controller; 300: delay unit; 400: analog-to-digital converter;

500: trigger display unit; 501: waveform processing unit; 502: waveform drawing unit;

503: trigger interpolation unit; 504: trigger drawing unit; 505: waveform display unit.

DETAILED DESCRIPTION

The present disclosure will be described below with reference to the accompanying drawings. The embodiments of the present disclosure are shown in the accompanying drawings. However, the present disclosure can be implemented in many different forms.

Unless otherwise defined, all technical and scientific terms used herein have the same meanings as commonly understood by those skilled in the art of the present disclosure. The terms used in the description of the present disclosure are only for the purpose of describing specific embodiments and are not intended to limit the present disclosure. The term "and/or" used herein includes any and all combinations of one or more related listed items.

As used herein, the singular forms "a", "an", and "the" may also include plural forms unless the context clearly indicates otherwise. It should also be understood that when the terms "composed of" and/or "comprise/include" are used in this specification, the presence of the features, integers, steps, operations, elements, and/or parts can be determined, but do not preclude the presence or addition of one or more other features, integers, steps, operations, elements, parts, and/or groups. At the same time, as used herein, the term "and/or" includes any and all combinations of related listed items.

The drawings provided in this embodiment are only schematic illustrations of the basic concepts of the present disclosure. Although the drawings only show components related to the present disclosure and are not drawn according to the number, shapes, and sizes of components during actual implementation. The shapes, number, and proportions of a plurality of components can be arbitrarily changed in the actual implementation, and the layout of components may be more complex.

Although terms such as "first", "second," etc., may be used herein to describe various elements, these elements should not be limited by these terms. These terms are only used to distinguish one element from another. For example, without departing from the scope of the present disclosure, a first element may be referred to as a second element. Similarly, the second element may be referred to as the first element.

In the present disclosure, unless otherwise specified and defined, terms such as "connect with", "connect to", etc., should be understood in a general manner. For example, they may refer to a direct connection or an indirect connection through intermediate media, or may refer to an internal connection between two elements or an interaction relationship between two elements. For those ordinary skilled in the art, the meanings of these terms in the present disclosure can be understood according to the condition.

Figure 1:
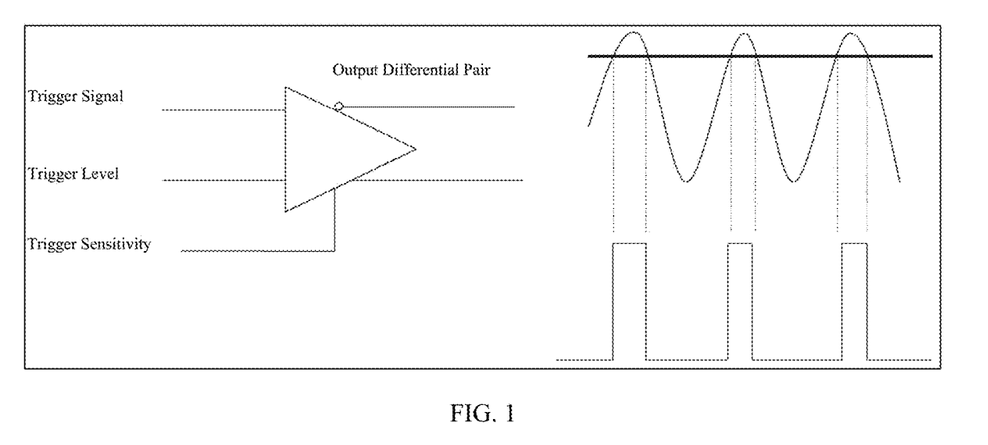
FIG. 1 is a schematic diagram of a signal processing apparatus according to an embodiment of the present disclosure.

Please refer to FIG. 1, a traditional analog oscilloscope adopts an analog circuit, such as an oscilloscope tube. An electron gun of the oscilloscope tube emits electrons toward a screen, and the emitted electrons are focused to form an electron beam and hits the screen, an inner surface of which is coated with fluorescent material. In this way, a point where the electron beam hits emits light, thereby drawing the waveform curve. A digital storage oscilloscope (DSO), referred to as a digital oscilloscope, converts a measured signal into digital information through an analog-to-digital converter (ADC) and stores the digital information. The stored digital information is used to reconstruct the waveform signal, and the waveform signal is displayed on the screen of the oscilloscope. Without any special settings, the oscilloscope captures signals at a fixed frequency to generate waveforms. Due to the inconsistency between a sampling frequency and a change frequency of signals, the waveforms generated by capturing signals by the oscilloscope at each time may be different. To obtain stable waveform display, a "trigger event" (such as a level, i.e., a trigger level) is usually set to synchronize a scanning frequency of the oscilloscope with the change frequency of signals. That is, when the oscilloscope detects that a target event occurs in a signal stream, such as a captured signal being greater than or equal to the trigger level, a comparator in a trigger module of the oscilloscope will output a high level, so that the oscilloscope starts to scan and display a waveform from this point. To make the collected output waveform more stable and reliable, the digital oscilloscope can set a specific coupling mode according to signal characteristics under a trigger function to filter out noise and prevent false triggering.

When the triggering of the digital oscilloscope is unstable due to low-frequency interference contained in the collected signal, such as 50 Hz power frequency interference in power supply ripple, a low-frequency suppression mode in the triggering function of the digital oscilloscope is usually adopted. However, when using the digital oscilloscope, in a case that the triggering function adopts the low-frequency suppression mode or an AC triggering coupling mode, the waveform sampled by the digital circuit can pass through a digital low-pass filter, a low-frequency component is suppressed, and a high-frequency component is retained. Therefore, after the trigger signal passes through the filter, a low-frequency signal is suppressed, the deviation of the sampled waveform displayed on the oscilloscope interface from a pulse voltage set by a user is generated due to the lack of a corresponding relationship between the setting of trigger level and the actual trigger signal. Therefore, when adjusting the trigger level, the user cannot intuitively observe relevant information of an actual trigger signal (e.g., peak information of the actual trigger signal) after the low-frequency signal is suppressed.

In view of this, the present disclosure provides a signal processing apparatus and method, and a digital oscilloscope, which can at least correct the deviation between the trigger level and the trigger signal, establish a corresponding relationship between the setting of the trigger level and the actual trigger signal and display it on the interactive interface in a case that the trigger function of the digital oscilloscope adopts the low-frequency suppression mode or the AC trigger coupling mode, such that the user intuitively observes the relevant information of the actual trigger signal after the low-frequency signal is suppressed, thereby facilitating the adjustment on the trigger level performed by the user and improving the setting accuracy of the trigger level.

Figure 2:
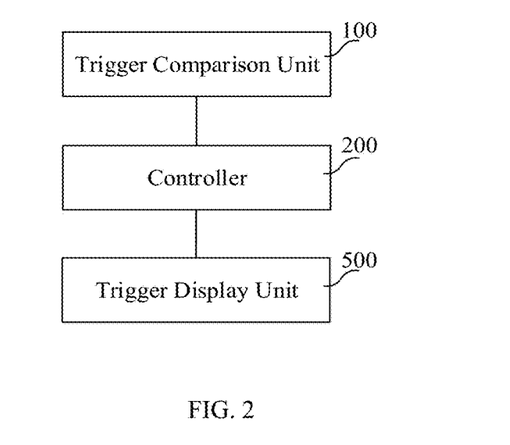
FIG. 2 is a schematic diagram of another signal processing apparatus according to an embodiment of the present disclosure.

Please refer to FIG. 2, according to some embodiments, a signal processing apparatus is provided, which is configured to output a target signal, such as one of the following two target signals, according to a trigger signal and a trigger level. The signal processing apparatus includes a trigger comparison unit 100, a trigger display unit 500, and a controller 200. The trigger comparison unit 100 is configured to extract a low-frequency component signal from the trigger signal. The controller 200 is electrically connected to the trigger comparison unit 100 and is configured to generate a trigger comparison signal according to a relationship between the low-frequency component signal and the trigger signal, and output a target signal obtained based on the trigger comparison signal according to a preset rule. The preset rule includes comparing the trigger comparison signal with the trigger level. The trigger display unit 500 is electrically connected to the controller and is configured to receive the target signal and display the target signal on a target interactive interface.

Please continue to refer to FIG. 2, in the signal processing apparatus in the above embodiment, by extracting the low-frequency component signal (e.g., the low-frequency component signal including a direct current (DC) signal) from the trigger signal, generating the trigger comparison signal according to the relationship between the low-frequency component signal and the trigger signal, that is, obtaining the actual trigger signal after the low-frequency signal is suppressed, and outputting the target signal obtained based on the trigger comparison signal, where the target signal includes relevant information of the actual trigger signal after the low-frequency signal is suppressed, the corresponding relationship between the setting of the trigger level and the actual trigger signal is established, the deviation between the trigger level and the trigger signal is corrected, and the target signal is displayed on the interactive interface in a case that the trigger function of the digital oscilloscope adopts the low-frequency suppression mode or AC trigger coupling mode, such that the user can intuitively observe the relevant information of the actual trigger signal after the low-frequency signal is suppressed, thereby facilitating the adjustment on the trigger level performed by the user and improving the setting accuracy of the trigger level.

Please continue to refer to FIG. 2, in some embodiments, the trigger comparison signal is a signal obtained by filtering out the low-frequency component signal from the trigger signal, so that the trigger comparison signal is converted into a high-frequency AC signal.

In some embodiments, the trigger comparison unit 100 includes a digital filter. The digital filter can use the arithmetic statistical average to obtain an instantaneous DC component size, thereby extracting the low-frequency component signal from the trigger signal. The digital filter includes a finite impulse response (FIR) filter, or an infinite impulse response (IIR) filter, etc. For example, the digital filter can be the FIR filter. The FIR filter is also referred to as a non-recursive filter. As one of the most basic elements in a digital signal processing system, the FIR filter can guarantee arbitrary amplitude-frequency characteristics while having a strict linear phase-frequency characteristic. At the same time, its unit sample response is finite, thus the FIR filter is a stable system and is widely used in communication, image processing, pattern recognition, and other fields.

Figure 3:
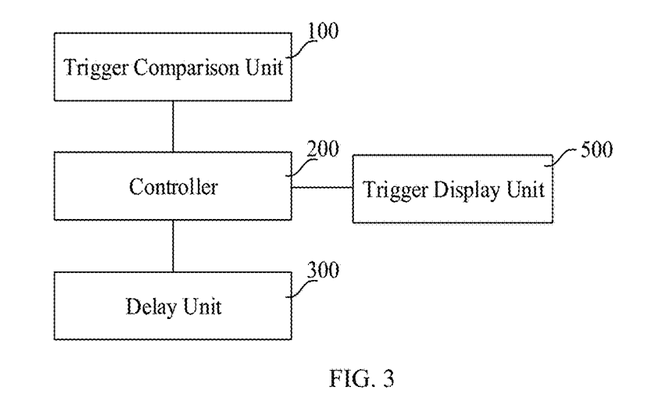
FIG. 3 is a schematic diagram of another signal processing apparatus according to an embodiment of the present disclosure.

Please refer to FIG. 3, in some embodiments, the signal processing apparatus further includes a delay unit 300. The delay unit 300 is electrically connected to the controller 200 and is configured to compensate for delay of the trigger comparison unit 100, so that the low-frequency component signal and the trigger signal moves in the time dimension. For example, the time dimension of the low-frequency component signal and the trigger signal is set to a horizontal direction, the movement of the low-frequency component signal and the trigger signal in the time dimension can be understood as a movement of the low-frequency component signal and the trigger signal in the horizontal direction, thereby aligning the low-frequency component signal and the trigger signal in the time dimension to facilitate subsequent signal processing and user's observation.

Figure 4:
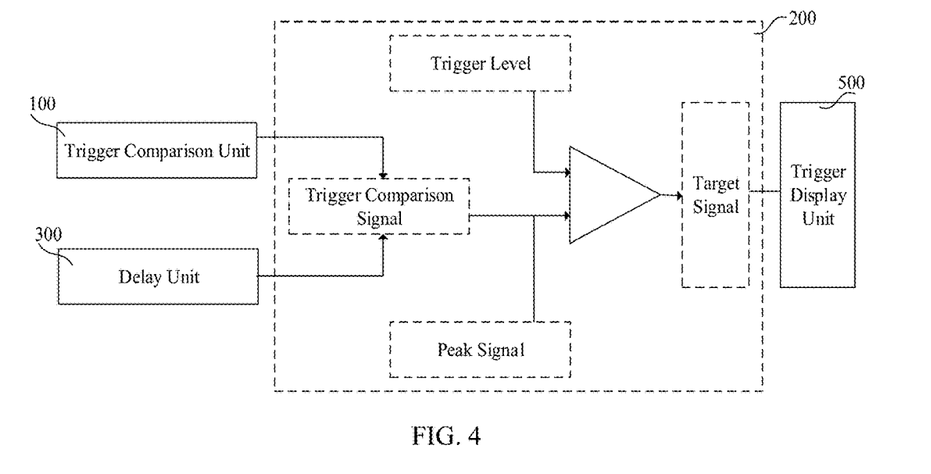
FIG. 4 is a schematic diagram of another signal processing apparatus according to an embodiment of the present disclosure.
Figure 5:
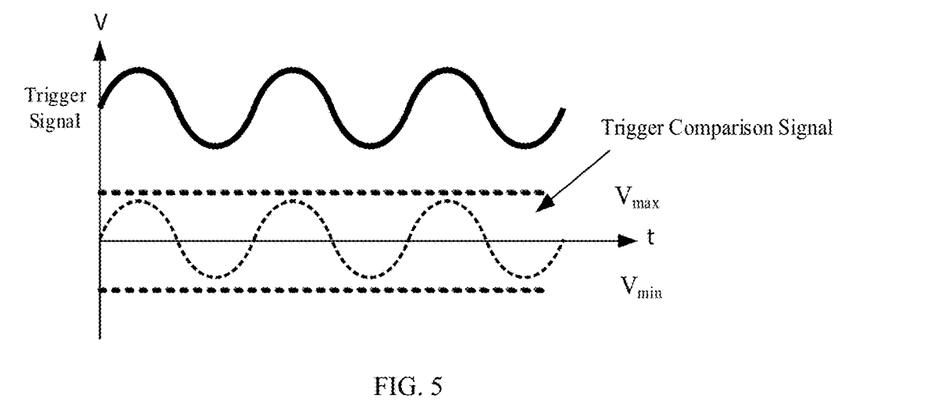
FIG. 5 is a curve diagram of a target signal according to an embodiment of the present disclosure.

Please refer to FIGS. 4 and 5, in some embodiments, the controller 200 is further configured to obtain a peak signal of the trigger comparison signal. By obtaining the peak signal of the trigger comparison signal, where the target signal includes the peak signal of the actual trigger signal after the low-frequency signal is suppressed, in a case that the trigger function of the digital oscilloscope adopts the low-frequency suppression mode or the AC trigger coupling mode, the corresponding relationship between the setting of the trigger level and the actual trigger signal is established, the deviation between the trigger level and the trigger signal is corrected, and the peak signal of the trigger comparison signal is displayed on the interactive interface, such that the user can intuitively observe the relevant information of the actual trigger signal after the low-frequency is suppressed, thereby facilitating the adjustment on the trigger level performed by the user according to the relevant information of the actual trigger signal and improving the setting accuracy of the trigger level. Moreover, by obtaining the peak signal of the trigger comparison signal, an amplitude range of the trigger comparison signal is determined without processing the complete trigger comparison signal, thereby simplifying the implementation method, reducing the signal processing data amount of the controller 200, and improving the signal processing efficiency of the signal processing apparatus.

In some embodiments, the preset rule includes: in a case that a value corresponding to an amplitude of the trigger comparison signal is less than a value corresponding to an amplitude of the trigger level, the digital oscilloscope stops the trigger function, and the target signal displayed by the trigger display unit on the target interactive interface includes the peak signal and an initial waveform. The initial waveform includes at least one waveform to be triggered. For example, the initial waveform includes a plurality of waveforms to be triggered with different phases, and the plurality of waveforms to be triggered with different phases are sequentially displayed on the target interactive interface. The user may adjust the trigger level based on the target signal displayed on the target interactive interface to improve the setting accuracy of the trigger level. The preset rule also includes: in a case that the value corresponding to the amplitude of the trigger comparison signal is greater than or equal to the value corresponding to the amplitude of the trigger level, the digital oscilloscope implements the trigger function, i.e., capturing a waveform to be triggered as a trigger waveform from the initial waveform, the target signal displayed by the trigger display unit on the target interactive interface includes the peak signal and the trigger waveform. The user can intuitively observe the trigger waveform displayed on the target interactive interface, as well as the relevant information of the trigger comparison signal, i.e., the relevant information of the actual trigger signal after the low-frequency signal is suppressed. In some embodiments, the trigger signal can be generated based on the initial waveform. In this embodiment, a value corresponding to an amplitude of a signal is the absolute value of the amplitude of the signal.

It should be noted that the trigger waveform corresponds to a waveform displayed on the target interactive interface by the trigger display unit when the trigger is successful, and the waveform to be triggered corresponds to a waveform displayed on the target interactive interface by the trigger display unit when not triggered, and the two waveforms differ only in name, and there is no substantial difference in the shape of waveform.

Please continue to refer to FIGS. 4 and 5, in some embodiments, the peak signal of the trigger comparison signal includes the maximum value Vmax and/or the minimum value Vmin of the trigger comparison signal. The amplitude range of the trigger comparison signal is from the maximum value Vmax to the minimum value Vmin of the trigger comparison signal, thereby establishing a corresponding relationship between the trigger level and the maximum value Vmax and/or the minimum value Vmin of the trigger comparison signal. The target signal may be displayed on a user interface in the form of an image. The trigger comparison signal shown in FIG. 5 will not be displayed on the user interface. Only the maximum value Vmax and/or the minimum value Vmin of the trigger comparison signal will be displayed on the user interface, thereby facilitating that the user intuitively observes the peak signal and providing a basis for setting the trigger level. The trigger level can be set between the maximum value Vmax and the minimum value Vmin of the trigger comparison signal, thereby facilitating the implementation of the oscilloscope's triggering function. In some embodiments, the trigger level can be set in the range of 0.5 Vmax to 0.8 Vmax or 0.5 Vmin to 0.8 Vmin. For example, the trigger level can be set to 0.5 Vmax, 0.6 Vmax, 0.7 Vmax, 0.8 Vmax, 0.5 Vmin, 0.6 Vmin, 0.7 Vmin, or 0.8 Vmin, thereby ensuring the implementation of the oscilloscope's trigger function.

Figure 6:
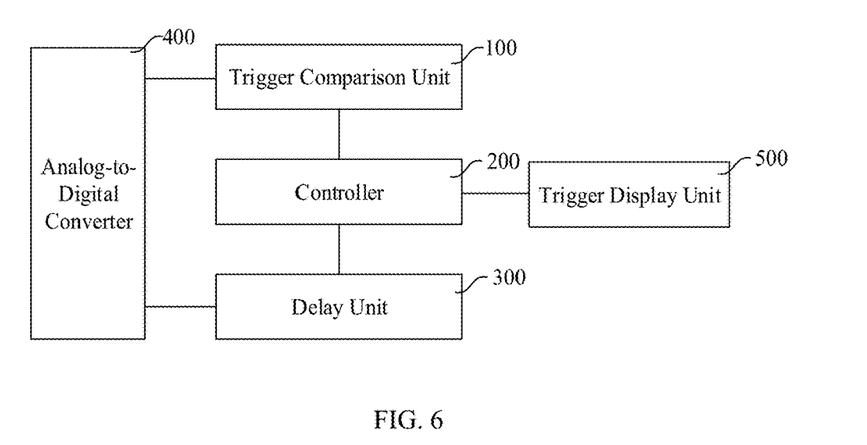
FIG. 6 is a schematic diagram of another signal processing apparatus according to an embodiment of the present disclosure.

Please refer to FIG. 6, in some embodiments, the signal processing apparatus further includes an analog-to-digital converter 400. An output terminal of the analog-to-digital converter 400 is connected to an input terminal of the trigger comparison unit 100 and an input terminal of the delay unit 300. The analog-to-digital converter 400 is configured to convert a trigger signal from an analog quantity to a digital quantity.

Figure 7:
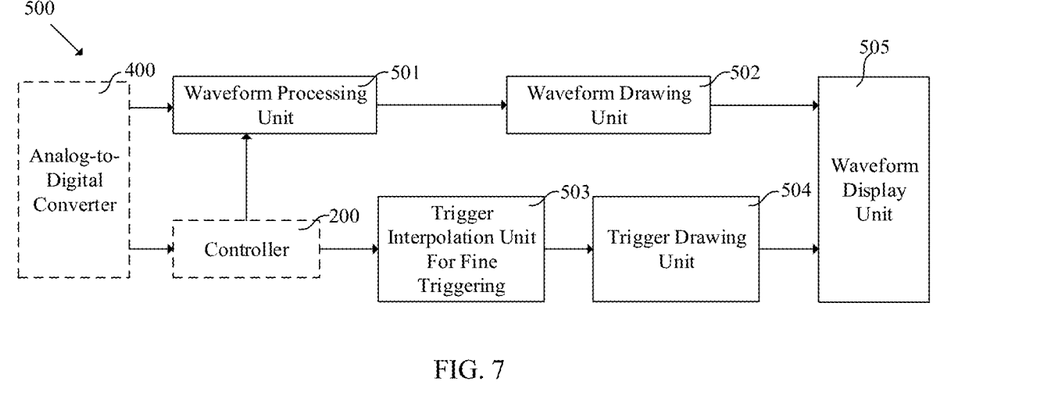
FIG. 7 is a schematic diagram of a waveform display unit according to an embodiment of the present disclosure.

Please refer to FIG. 7, in some embodiments, the controller 200 is configured to generate the trigger comparison signal, and the trigger display unit 500 is configured to output and display the target signal. The trigger display unit 500 includes a waveform processing unit 501, a waveform drawing unit 502, a trigger interpolation unit 503, a trigger drawing unit 504, and a waveform display unit 505. An input terminal of the waveform processing unit 501 is connected to the analog-to-digital converter 400 and the controller 200. The waveform processing unit 501 is configured to receive a trigger position and a trigger level pulse output by the controller 200 and a trigger signal output via the analog-to-digital converter 400 and output a waveform signal to be drawn. An input terminal of the waveform drawing unit 502 is connected to the output terminal of the waveform processing unit 501, and an output terminal of the waveform drawing unit 502 is connected to the waveform display unit 505. The waveform drawing unit 502 is configured to receive the waveform signal to be drawn and output a waveform signal to be displayed. An input terminal of the trigger interpolation unit 503 is connected to an output terminal of the controller 200, and an output terminal of the trigger interpolation unit 503 is connected to an input terminal of the trigger drawing unit 504. The trigger interpolation unit 503 is configured to perform fine triggering on the trigger comparison signal output by the controller 200 and output the trigger waveform signal to be drawn, thereby achieving a higher equivalent sampling rate. The fine triggering refers to a process where, when the number of sampling points is less than the number of pixels on a display interface, interpolation of the original data need to be performed, and threshold comparison and trigger position processing need to be performed on the interpolated data in order to more accurately find a interpolation point where the trigger position is located. For example, if an original sampling rate is 10 GSa/s and a sampling point interval is 100 ps, when an interpolation multiple is 100 times, an equivalent sampling rate is increased by 100 times, and a trigger resolution is also increased by 100 times, thereby performing trigger processing with a resolution of 1 ps. An output terminal of the trigger drawing unit 504 is connected to the waveform display unit 505. The trigger drawing unit 504 is configured to receive the trigger waveform signal to be drawn and output the trigger waveform signal to be displayed. The waveform display unit 505 is configured to display the target signal on the target interactive interface, so that the user observes the relevant information of the actual trigger signal more intuitively after the low-frequency signal is suppressed, thereby facilitating the adjustment on the trigger level performed by the user and improving the setting accuracy of the trigger level. In some embodiments, a display module of the waveform display unit 505 can use a field-programmable gate array (FPGA) or a central processing unit (CPU)/processor for display processing. For example, a processing method using the FPGA has a rapid display speed, while a processing method using the CPU has a more flexible display form. In some embodiments, the waveform display unit 505 can display signals in a floating manner or a split-screen manner. For example, when the split-screen display manner is adopted, the split-screen display can be understood as that an upper half of the screen displays the waveform signal to be displayed, and a lower half of the screen displays the trigger waveform signal to be displayed, or vice versa. For another example, when the floating screen display manner is adopted, the floating screen display manner can be understood as that a display window of the trigger waveform signal to be displayed floats above a display window of the waveform signal to be displayed. The switch between these two display manners can be achieved through a switching configuration of a configuration window, or can be selected and configured through a menu of the signal processing apparatus, or can be achieved through a quick icon on the user interface, thereby enhancing the user's interactive experience.

According to some embodiments, another aspect of the present disclosure provides a digital oscilloscope including the signal processing apparatus described in any of the above embodiments.

In the digital oscilloscope in the above embodiments, by extracting the low-frequency component signal from the trigger signal, for example, the low-frequency component signal including a DC signal; by generating the trigger comparison signal according to the relationship between the low-frequency component signal and the trigger signal, that is, obtaining the actual trigger signal after the low-frequency is suppressed; and by outputting the target signal obtained based on the trigger comparison signal, where the target signal includes relevant information of the actual trigger signal after the low-frequency signal is suppressed, the corresponding relationship between the setting of the trigger level and the actual trigger signal is established, the deviation between the trigger level and the trigger signal is corrected, and the target signal including the trigger comparison signal is displayed on the interactive interface in a case that the trigger function of the digital oscilloscope adopts the low-frequency suppression mode or the AC trigger coupling mode, so that the user can intuitively observe the relevant information of the actual trigger signal after the low-frequency is suppressed, thereby facilitating the adjustment on the trigger level performed by the user according to the relevant information of the actual trigger signal, and improving the setting accuracy of the trigger level.

Figure 8:
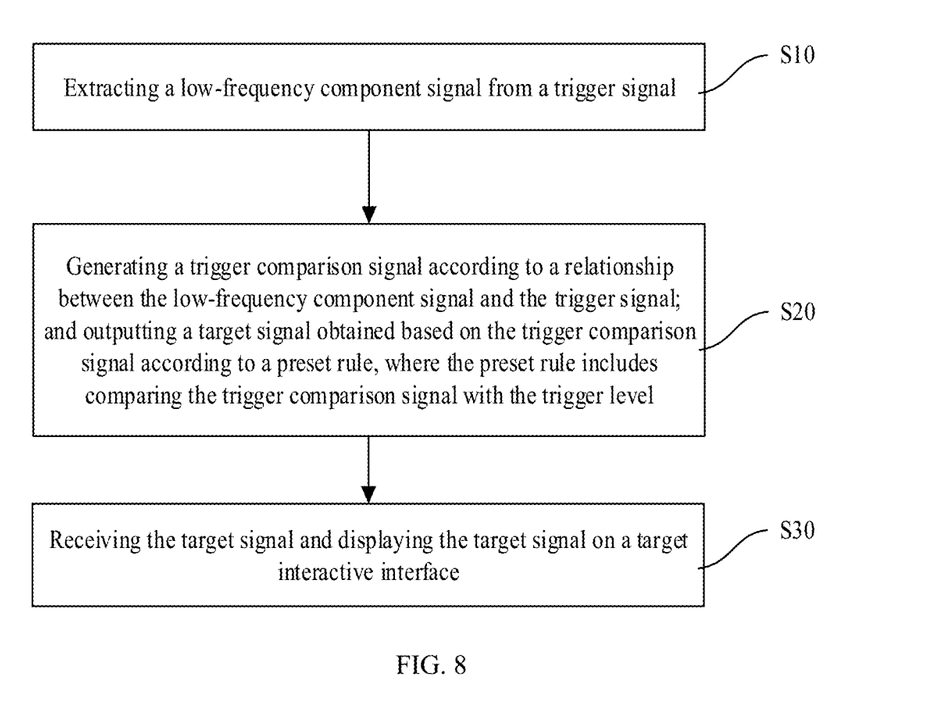
FIG. 8 is a flowchart of a signal processing method according to an embodiment of the present disclosure.

Please refer to FIG. 8, according to some embodiments, a signal processing method is provided for outputting one of two target signals based on a trigger signal and a trigger level. The method includes:
　　Step S10: extracting a low-frequency component signal from a trigger signal.
　　Step S20: generating a trigger comparison signal according to a relationship between the low-frequency component signal and the trigger signal; and outputting a target signal obtained based on the trigger comparison signal according to a preset rule, where the preset rule includes comparing the trigger comparison signal with the trigger level.

Step S30: receiving the target signal and displaying the target signal on a target interactive interface.

Please continue to refer to FIG. 8, in steps S10 and S20 of the signal processing method in the above embodiment, by generating the trigger comparison signal according to the relationship between the low-frequency component signal and the trigger signal, that is, obtaining the actual trigger signal after the low-frequency is suppressed, and by outputting the target signal obtained based on the trigger comparison signal, where the target signal includes the relevant information of the actual trigger signal after the low-frequency is suppressed, the corresponding relationship between the setting of the trigger level and the actual trigger signal is established, the deviation between the trigger level and the trigger signal is corrected, and the target signal including the trigger comparison signal is displayed on the interactive interface in a case that the trigger function of the digital oscilloscope adopts the low-frequency suppression mode or the AC trigger coupling mode, so that the user can intuitively observe the relevant information of the actual trigger signal after the low-frequency signal is suppressed, thereby facilitating the adjustment on the trigger level performed by the user according to the relevant information of the actual trigger signal, and improving the setting accuracy of the trigger level.

Although the steps in the flowchart in FIG. 8 are shown in sequence according to the direction of arrows, these steps are not necessarily executed in the order indicated by the arrows. Unless explicitly stated herein, these steps are not strictly executed sequentially, and these steps may be executed in other orders. Moreover, although at least part of the steps in FIG. 8 may include a plurality of sub-steps or stages, these sub-steps or stages are not necessarily executed at the same time, but may be executed at different times. The execution order of these sub-steps or stages is not necessarily executed sequentially, but may be executed alternately or in turn with at least part of other steps or sub-steps or stages of other steps.

In some embodiments, the trigger comparison signal is a signal obtained by filtering out the low-frequency component signal from the trigger signal, so that the trigger comparison signal is converted into a high-frequency AC signal.

Please continue to refer to FIGS. 2 and 8, in some embodiments, the trigger comparison unit 100 includes a digital filter. The digital filter can use the arithmetic statistical average to obtain an instantaneous DC component size, thereby extracting the low-frequency component signal from the trigger signal. The digital filter includes a FIR filter, or an IIR filter, etc. For example, the digital filter can be the FIR filter. The FIR filter is also referred to as a non-recursive filter. As one of the most basic elements in a digital signal processing system, the FIR filter can guarantee arbitrary amplitude-frequency characteristics while having a strict linear phase-frequency characteristic. At the same time, its unit sample response is finite, thus the FIR filter is a stable system and is widely used in communication, image processing, pattern recognition, and other fields.

Please refer to FIGS. 3 and 8, in some embodiments, the signal processing apparatus further includes a delay unit 300. The delay unit 300 is electrically connected to the controller 200. The signal processing method further includes compensating for delay of the trigger comparison unit 100, so that the low-frequency component signal and the trigger signal can move in the time dimension. For example, the time dimension of the low-frequency component signal and the trigger signal is set to a horizontal direction, the movement of the low-frequency component signal and the trigger signal in the time dimension can be understood as a movement of the low-frequency component signal and the trigger signal in the horizontal direction, thereby aligning the low-frequency component signal and the trigger signal in the time dimension to facilitate subsequent signal processing and user's observation.

Please refer to FIGS. 4, 5, and 8, in some embodiments, the signal processing method further includes obtaining a peak signal of the trigger comparison signal. By obtaining the peak signal of the trigger comparison signal, where the target signal includes the peak signal of the actual trigger signal after the low-frequency signal is suppressed, the corresponding relationship between the setting of the trigger level and the actual trigger signal is established, the deviation between the trigger level and the trigger signal is corrected, and the peak signal of the trigger comparison signal is displayed on the interactive interface in a case that the trigger function of the digital oscilloscope adopts the low-frequency suppression mode or the AC trigger coupling mode, such that the user can intuitively observe a peak signal of the actual trigger signal after the low-frequency signal is suppressed, thereby facilitating that the user adjusts the trigger level according to relevant information of the actual trigger signal and improving the setting accuracy of the trigger level. Moreover, by obtaining the peak signal of the trigger comparison signal, an amplitude range of the trigger comparison signal is determined without processing the complete trigger comparison signal, thereby simplifying the implementation method, reducing the signal processing data amount of the controller 200, and improving the signal processing efficiency of the signal processing apparatus.

In some embodiments, the preset rule includes: in a case that a value corresponding to an amplitude of the trigger comparison signal is less than a value corresponding to an amplitude of the trigger level, the digital oscilloscope stops the trigger function, and the target signal displayed by the trigger display unit on the target interactive interface includes the peak signal and an initial waveform. The initial waveform includes at least one waveform to be triggered. For example, the initial waveform includes a plurality of waveforms to be triggered with different phases, and the plurality of waveforms to be triggered with different phases are sequentially displayed on the target interactive interface. The user may adjust the trigger level based on the target signal displayed on the target interactive interface to improve the setting accuracy of the trigger level. The preset rule also includes: in a case that the value corresponding to the amplitude of the trigger comparison signal is greater than or equal to the value corresponding to the amplitude of the trigger level, the digital oscilloscope implements the trigger function, i.e., capturing a waveform to be triggered as a trigger waveform from the initial waveform. The target signal displayed by the trigger display unit on the target interactive interface includes the peak signal and the trigger waveform. The user can intuitively observe the trigger waveform displayed on the target interactive interface, as well as the relevant information of the trigger comparison signal, i.e., the relevant information of the actual trigger signal after the low-frequency signal is suppressed. In some embodiments, the trigger signal can be generated based on the initial waveform. In this embodiment, a value corresponding to an amplitude of a signal is the absolute value of the signal amplitude.

It should be noted that the trigger waveform corresponds to a waveform displayed on the target interactive interface by the trigger display unit when the trigger is successful, and the waveform to be triggered corresponds to a waveform displayed on the target interactive interface by the trigger display unit when not triggered, and the two waveforms differ only in name, and there is no substantial difference in the shape of waveform.

Please continue to refer to FIGS. 4, 5, and 8, in some embodiments, the peak signal of the trigger comparison signal includes the maximum value Vmax and/or the minimum value Vmin of the trigger comparison signal. The amplitude range of the trigger comparison signal is from the maximum value Vmax to the minimum value Vmin of the trigger comparison signal, thereby establishing a corresponding relationship between the trigger level and the maximum value Vmax and/or the minimum value Vmin of the trigger comparison signal. The target signal may be displayed on a user interface in the form of an image. The trigger comparison signal shown in FIG. 5 will not be displayed on the user interface. Only the maximum value Vmax and/or the minimum value Vmin of the trigger comparison signal will be displayed on the user interface, thereby facilitating that the user intuitively observes the peak signal and providing a basis for setting the trigger level. The trigger level can be set between the maximum value Vmax and the minimum value Vmin of the trigger comparison signal, thereby facilitating the implementation of the oscilloscope's trigger function. In some embodiments, the trigger level can be set in the range of 0.5 Vmax to 0.8 Vmax or 0.5 Vmin to 0.8 Vmin. For example, the trigger level can be set to 0.5 Vmax, 0.6 Vmax, 0.7 Vmax, 0.8 Vmax, 0.5 Vmin, 0.6 Vmin, 0.7 Vmin, or 0.8 Vmin, etc., thereby ensuring the implementation of the oscilloscope's trigger function.

Please refer to FIGS. 6 and 8, in some embodiments, the signal processing apparatus further includes an analog-to-digital converter 400. An output terminal of the analog-to-digital converter 400 is connected to an input terminal of the trigger comparison unit 100 and an input terminal of the delay unit 300. The signal processing method further includes converting the trigger signal from an analog quantity to a digital quantity.

Through the above description of the embodiments, those skilled in the art can clearly understand that the present disclosure can be implemented by a software combining with a necessary general hardware, or by a hardware. Based on this understanding, the technical solution of the present disclosure can essentially be embodied in the form of a software product, and the computer software product can be stored in a computer-readable storage medium, such as a floppy disk, a read-only memory (ROM), a random access memory (RAM), a flash memory, a hard disk, or an optical disk of a computer, etc. The software product includes a plurality of instructions to enable a computer device (which can be a personal computer, a server, a network device, etc.) to execute the method described in the embodiments of the present disclosure.

Those skilled in the art can understand that all or part of the processes of the method in the above embodiments can be implemented by instructing a relevant hardware by a computer program. The computer program can be stored in a non-volatile computer-readable storage medium. When executed, the computer program can include the processes of the methods in the above embodiments. Any reference to memory, storage, database, or other media in the plurality of embodiments provided by the present disclosure may include non-volatile and/or volatile memory.

The above embodiments are only for illustrative purposes.

The embodiments in this specification are described in a progressive manner, each embodiment focuses on the differences from other embodiments. The same or similar parts between the embodiments can be referred to each other.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The invention claimed is:

1. A signal processing apparatus configured to output one of two target signals according to a trigger signal and a trigger level, the signal processing apparatus comprising:
   a trigger comparison unit configured to extract a low-frequency component signal from the trigger signal;
   a controller electrically connected to the trigger comparison unit and configured to generate a trigger comparison signal according to a relationship between the low-frequency component signal and the trigger signal, and output a target signal obtained based on the trigger comparison signal according to a preset rule, wherein the trigger comparison signal is a signal obtained by filtering out the low-frequency component signal from the trigger signal, and the preset rule comprises comparing the trigger comparison signal with the trigger level; and
   a trigger display unit electrically connected to the controller and configured to receive the target signal and display the target signal on a target interactive interface.

2. The signal processing apparatus according to claim 1, further comprising:
   a delay unit electrically connected to the controller and configured to compensate for delay of the trigger comparison unit to align the low-frequency component signal and the trigger signal in time dimension.

3. The signal processing apparatus according to claim 2, wherein the controller is further configured to obtain a peak signal of the trigger comparison signal.

4. The signal processing apparatus according to claim 3, wherein the preset rule comprises:
   in a case that a value corresponding to an amplitude of the trigger comparison signal is greater than or equal to a value corresponding to an amplitude of the trigger level, the target signal displayed on the target interactive interface comprises the peak signal and a trigger waveform; and
   in a case that the value corresponding to the amplitude of the trigger comparison signal is less than the value corresponding to the amplitude of the trigger level, the target signal displayed on the target interactive interface comprises the peak signal and an initial waveform, wherein the initial waveform comprises at least one waveform to be triggered.

5. The signal processing apparatus according to claim 3, further comprising:
   an analog-to-digital converter configured to convert the trigger signal from an analog quantity to a digital quantity, wherein an output terminal of the analog-todigital converter is connected to an input terminal of the trigger comparison unit and an input terminal of the delay unit.

6. The signal processing apparatus according to claim 3, wherein the peak signal of the trigger comparison signal comprises at least one of the maximum value and the minimum value of the trigger comparison signal.

7. The signal processing apparatus according to claim 4, further comprising:
an analog-to-digital converter configured to convert the trigger signal from an analog quantity to a digital quantity, wherein an output terminal of the analog-to-digital converter is connected to an input terminal of the trigger comparison unit and an input terminal of the delay unit.

8. A digital oscilloscope comprising the signal processing apparatus according to claim 1.

9. A digital oscilloscope comprising the signal processing apparatus according to claim 2.

10. A digital oscilloscope comprising the signal processing apparatus according to claim 3.

11. A digital oscilloscope comprising the signal processing apparatus according to claim 4.

12. A digital oscilloscope comprising the signal processing apparatus according to claim 5.

13. A digital oscilloscope comprising the signal processing apparatus according to claim 6.

14. A digital oscilloscope comprising the signal processing apparatus according to claim 7.

15. A digital oscilloscope comprising a signal processing apparatus, wherein the signal processing apparatus is configured to output one of two target signals according to a trigger signal and a trigger level, and comprises:
a trigger comparison unit configured to extract a low-frequency component signal from the trigger signal;
a controller electrically connected to the trigger comparison unit and configured to generate a trigger comparison signal according to a relationship between the low-frequency component signal and the trigger signal, and output the target signal obtained based on the trigger comparison signal according to a preset rule, wherein the trigger comparison signal is a signal obtained by filtering out the low-frequency component signal from the trigger signal, and the preset rule comprises comparing the trigger comparison signal with the trigger level; and
a trigger display unit electrically connected to the controller and configured to receive the target signal and display the target signal on a target interactive interface.

16. A signal processing method for outputting one of two target signals according to a trigger signal and a trigger level, the method comprising:
extracting a low-frequency component signal from the trigger signal;
generating a trigger comparison signal according to a relationship between the low-frequency component signal and the trigger signal, wherein the trigger comparison signal is a signal obtained by filtering out the low-frequency component signal from the trigger signal;
outputting a target signal obtained based on the trigger comparison signal according to a preset rule, wherein the preset rule comprises comparing the trigger comparison signal with the trigger level; and
receiving the target signal and displaying the target signal on a target interactive interface.

* * * * *